(12) United States Patent
Tauchi

(10) Patent No.: US 8,675,089 B2
(45) Date of Patent: Mar. 18, 2014

(54) APPARATUS AND METHOD FOR ASSISTING COMPOSITION OF PHOTOGRAPHIC IMAGE

(75) Inventor: Youichiro Tauchi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 12/978,228

(22) Filed: Dec. 23, 2010

(65) Prior Publication Data
US 2011/0157406 A1 Jun. 30, 2011

(30) Foreign Application Priority Data

Dec. 25, 2009 (JP) ................................ 2009-295947
Dec. 14, 2010 (KR) ........................ 10-2010-0127872

(51) Int. Cl.
*H04N 5/228* (2006.01)
(52) U.S. Cl.
USPC .............. 348/222.1; 348/333.01; 348/333.02; 348/333.03; 382/201
(58) Field of Classification Search
USPC .............. 348/222.1, 333.01–333.03; 382/201
See application file for complete search history.

(56) References Cited

U.S. PATENT DOCUMENTS

| 5,873,007 | A * | 2/1999 | Ferrada Suarez | 396/296 |
| 6,806,906 | B1 * | 10/2004 | Soga et al. | 348/333.03 |
| 7,120,461 | B2 * | 10/2006 | Cho | 455/556.1 |
| 7,317,485 | B1 * | 1/2008 | Miyake et al. | 348/333.02 |
| 7,460,782 | B2 * | 12/2008 | Chan et al. | 396/281 |
| 8,509,608 | B2 * | 8/2013 | Kim | 396/50 |
| 2009/0252420 | A1 * | 10/2009 | Sakurai | 382/202 |
| 2010/0039548 | A1 * | 2/2010 | Sakai | 348/333.12 |
| 2010/0329552 | A1 * | 12/2010 | Yim et al. | 382/165 |
| 2011/0115933 | A1 * | 5/2011 | Yamazaki et al. | 348/220.1 |
| 2011/0164728 | A1 * | 7/2011 | Tsuchiya et al. | 378/62 |
| 2011/0187885 | A1 * | 8/2011 | Kim | 348/222.1 |
| 2011/0242348 | A1 * | 10/2011 | Yana | 348/222.1 |

FOREIGN PATENT DOCUMENTS

| JP | 2000-333045 A | 11/2000 |
| JP | 2001-086339 A | 3/2001 |
| JP | 2002-344723 A | 11/2002 |
| JP | 2004-104463 A | 4/2004 |
| JP | 2005-198035 A | 7/2005 |
| JP | 2006-129391 A | 5/2006 |

(Continued)

OTHER PUBLICATIONS

Office Action issued for JP 2009-295947 (Sep. 17, 2013).

*Primary Examiner* — Roberto Velez
*Assistant Examiner* — Cynthia Segura
(74) *Attorney, Agent, or Firm* — Drinker Biddle & Reath LLP

(57) ABSTRACT

A photographing apparatus includes an auxiliary line display unit displaying auxiliary lines including at least one of at least one vertical line movable in a horizontal direction within a screen and at least one horizontal line movable in a vertical direction within the screen, an edge extracting unit extracting an edge of an object image from image data obtained by photographing an object, a straight line detecting unit detecting at least one straight line portion from the extracted edge, a target extracting unit extracting a target straight line portion from the detected at least one straight line portion, according to at least one of an inclination and a length of the detected at least one straight line portion, and a distance calculating unit calculating a distance between the extracted target straight line portion and at least one of the vertical line and the horizontal line.

14 Claims, 7 Drawing Sheets

(56) References Cited

FOREIGN PATENT DOCUMENTS

| | | |
|---|---|---|
| JP | 2006-165941 A | 6/2006 |
| JP | 2006-324948 A | 11/2006 |
| JP | 2007-173966 A | 7/2007 |
| JP | 2007-174548 A | 7/2007 |
| JP | 2007-279767 A | 10/2007 |
| JP | 2008-219874 A | 9/2008 |

* cited by examiner

APPARATUS AND METHOD FOR ASSISTING COMPOSITION OF PHOTOGRAPHIC IMAGE

CROSS-REFERENCE TO RELATED PATENT APPLICATION

This application claims the benefit of Japanese Patent Application No. 2009-295947, filed on Dec. 25, 2009, in the Japanese Patent Office, and Korean Patent Application No. 10-2010-0127872, filed on Dec. 14, 2010, in the Korean Intellectual Property Office, the disclosures of which are incorporated herein in their entirety by reference.

BACKGROUND

The invention relates to a photographing apparatus and method. When a still image or a moving image is captured by using a photographing apparatus such as a digital still camera or a video camera, a photographer may easily determine a composition of an object image through auxiliary lines displayed on a screen such as a Liquid Crystal Display (LCD) monitor or an Electronic View Finder (EVF).

SUMMARY

Various embodiments of the invention provide a photographing apparatus and method which displays auxiliary lines to which a photographer can easily align an object image, instead of cumbersome auxiliary lines.

According to an embodiment of the invention, a photographing apparatus is provided. The photographing apparatus includes an auxiliary line display unit displaying auxiliary lines including at least one of at least one vertical line movable in a horizontal direction within a screen and at least one horizontal line movable in a vertical direction within the screen, an edge extracting unit extracting an edge of an object image from image data obtained by photographing an object, a straight line detecting unit detecting at least one straight line portion from the extracted edge, a target extracting unit extracting a target straight line portion from the detected at least one straight line portion, according to at least one of an inclination and a length of the detected at least one straight line portion, and a distance calculating unit calculating a distance between the extracted target straight line portion and at least one of the vertical line and the horizontal line, in which the auxiliary line display unit moves at least one of the vertical line and the horizontal line towards the target straight line portion based on the calculated distance between the target straight line portion and the at least one of the vertical line and the horizontal line.

The auxiliary line display unit may display the at least one of the vertical line and the horizontal line while moving the at least one of the vertical line and the horizontal line based on the calculated distance between the target straight line portion and the at least one of the vertical line and the horizontal line.

The photographing apparatus may further include a mode determining unit determining whether the photographing apparatus is in an auxiliary line display mode where at least one of the vertical line and the horizontal line is displayed within the screen, in which the auxiliary line display unit displays the at least one of the vertical line and the horizontal line within the screen if the mode determining unit determines that the photographing apparatus is in the auxiliary line display mode, and does not display the at least one of the vertical line and the horizontal line if the mode determining unit determines that the photographing apparatus is not in the auxiliary line display mode.

The target extracting unit may extract a straight line portion having the largest length among the detected at least one straight line portion as the target straight line portion.

The target extracting unit may extract a straight line portion having the smallest inclination with respect to the horizontal line or the vertical line among the detected at least one straight line portion as the target straight line portion.

The target extracting unit may extract a straight line portion having the smallest distance from the center of the screen among the detected at least one straight line portion as the target straight line portion.

If the target extracting unit cannot extract the target straight line portion, the distance calculating unit may calculate a distance between the center of the screen and the vertical line or the horizontal line, and the auxiliary line display unit may display the vertical line or the horizontal line while moving the vertical line or the horizontal line toward the center of the screen based on the distance between the center of the screen and the vertical line or the horizontal line.

According to another embodiment of the invention, there is a photographing apparatus including an auxiliary line display unit displaying auxiliary lines including at least one of at least one vertical line movable in a horizontal direction within a screen and at least one horizontal line movable in a vertical direction within the screen, an edge extracting unit extracting an edge of an object image from image data obtained by photographing an object, a straight line detecting unit detecting a plurality of straight line portions from the extracted edge, a target extracting unit extracting a target straight line portion from the plurality of detected straight line portions, according to inclinations and lengths of the plurality of detected straight line portions, and a distance calculating unit calculating a distance between the extracted target straight line portion and at least one of the vertical line and the horizontal line, in which the auxiliary line display unit displays the vertical line or the horizontal line while moving the vertical line or the horizontal line towards the target straight line portion based on the calculated distance between the target straight line portion and the vertical line or the horizontal line.

According to another embodiment of the invention, there is a photographing method including displaying auxiliary lines including at least one of at least one vertical line movable in a horizontal direction within a screen and at least one horizontal line movable in a vertical direction within the screen, extracting an edge of an object image from image data obtained by photographing an object, detecting at least one straight line portion from the extracted edge, extracting a target straight line portion from the detected at least one straight line portion, according to at least one of an inclination and a length of the detected at least one straight line portion, calculating a distance between the extracted target straight line portion and at least one of the vertical line and the horizontal line, and moving at least one of the vertical line and the horizontal line towards the target straight line portion based on the calculated distance between the target straight line portion and the at least one of the vertical line and the horizontal line.

The moving of the at least one of the vertical line and the horizontal line may include displaying the at least one of the vertical line and the horizontal line while moving the at least one of the vertical line and the horizontal line based on the calculated distance between the target straight line portion and the at least one of the vertical line and the horizontal line.

The photographing method may further include determining whether the photographing apparatus is in an auxiliary line display mode where at least one of the vertical line and the horizontal line is displayed within the screen, in which the displaying of the auxiliary lines includes displaying the at least one of the vertical line and the horizontal line within the screen if it is determined that a current mode is the auxiliary line display mode, and displaying neither the vertical line nor the horizontal line if the current mode is not the auxiliary line display mode.

The extracting of the target straight line portion may include extracting a straight line portion having the largest length among the detected at least one straight line portion as the target straight line portion.

The extracting of the target straight line portion may include extracting a straight line portion having the smallest inclination with respect to the horizontal line or the vertical line among the detected at least one straight line portion as the target straight line portion.

The extracting of the target straight line portion may include extracting a straight line portion having the smallest distance from a center of the screen among the detected at least one straight line portion as the target straight line portion.

According to another embodiment of the invention, there is provided a recording medium having recorded thereon a program for executing the photographing method on a computer.

BRIEF DESCRIPTION OF THE DRAWINGS

The above and other features and advantages of the invention will become more apparent by describing in detail an exemplary embodiment thereof with reference to the attached drawings in which.

DETAILED DESCRIPTION

Figure 1:
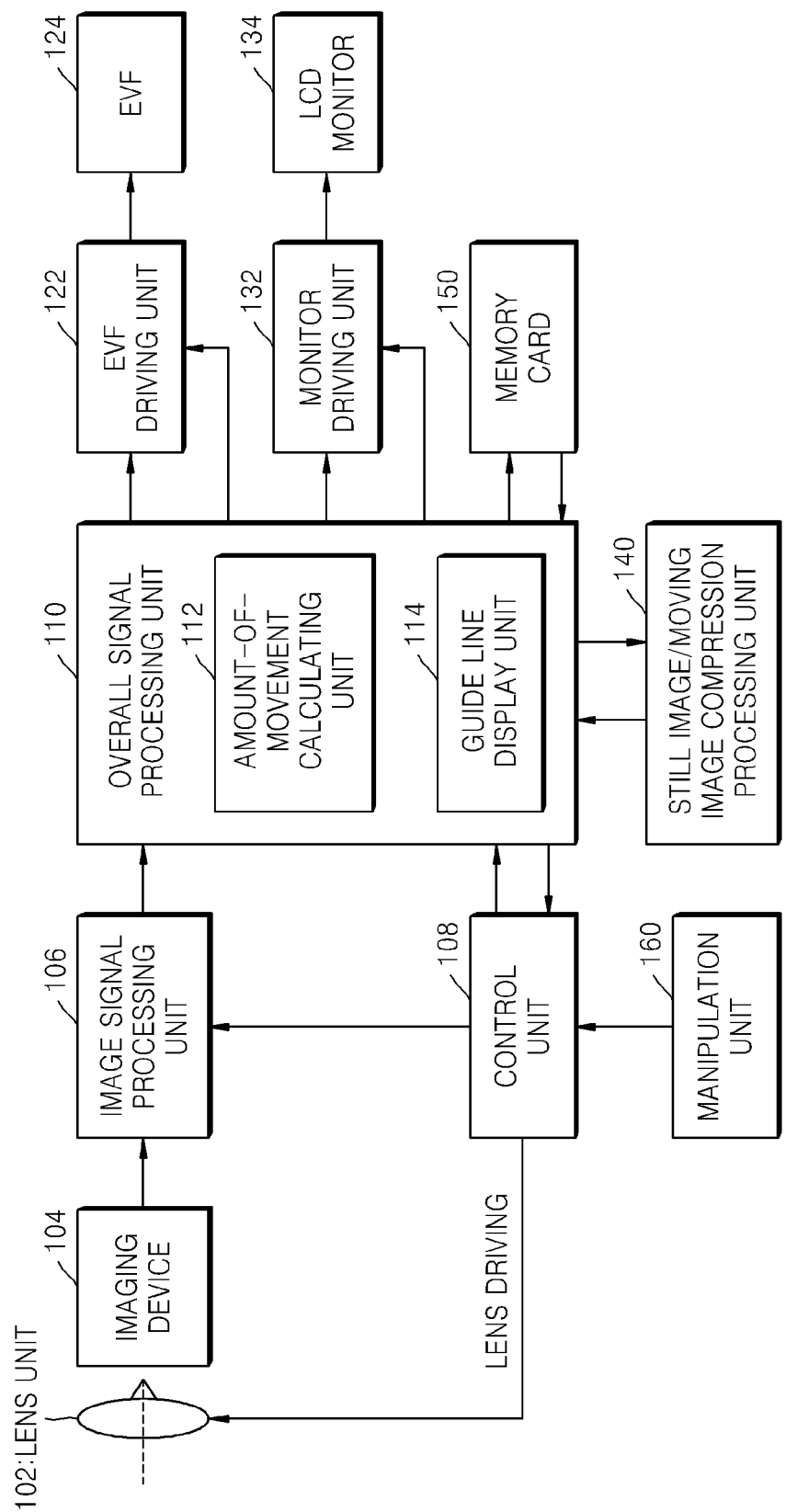
FIG. 1 is a block diagram of a photographing apparatus according to an embodiment of the invention.

Various embodiments of the invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, the thicknesses of layers and regions may be exaggerated for clarity. Like reference numerals in the drawings denote like elements, and thus their repetitive description will be omitted.

Though terms like "a first" and "a second" are used to describe various elements, the elements are not limited to these terms. These terms are used only to differentiate an element from another element.

The terminology used herein is for the purpose of describing particular embodiments only and is not intended to be limiting to particular embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

First, a description will be made of a photographing apparatus 100 according to an embodiment of the invention with reference to FIG. 1. FIG. 1 is a block diagram of the photographing apparatus 100 according to an embodiment of the invention.

The photographing apparatus 100 may be, for example, a digital still camera capable of capturing a still image or a video camera capable of capturing a moving image. In the current embodiment of the invention, display of guide lines (or auxiliary lines) within a screen may be applied to any live view display made in still image capturing and capturing image display made in moving image capturing. The display of guide lines within a screen may also be applied to moving image capturing by a digital still camera or still image capturing by a video camera.

The photographing apparatus 100 may include a lens unit 102, an imaging device 104, an image signal processing unit 106, a control unit 109, an overall signal processing unit 110, an Electronic View Finder (EVF) driving unit 122, an EVF 124, a monitor driving unit 132, a Liquid Crystal Display (LCD) monitor 134, a still image/moving image compression processing unit 140, a memory card 150, and a manipulation unit 160.

The lens unit 102 is an optical system which images external optical information on the imaging device 104, and passes light from an object through to the imaging device 104. The lens unit 102 may include, for example, a zoom lens, an iris, and a focus lens, which are not shown. The zoom lens is a lens for changing the angle of view by changing a focal length. The iris adjusts the amount of transmitting light. The focus lens focuses an object image on an imaging plane of the imaging device 104 by moving in an optical-axis direction. The focus lens is driven by the control unit 108.

The imaging device 104, which is an example of a photoelectric transformation device, includes a plurality of elements capable of performing a photoelectric transformation that transforms the optical information incident through the lens unit 102 into an electric signal. Each of the plurality of elements generates an electric signal corresponding to the amount of received light. The imaging device 104 may use a Charge Coupled Device (CCD) image sensor or a Complementary Metal Oxide Semiconductor (CMOS) image sensor.

To control exposure time of the imaging device 104, a mechanical shutter (not shown) may be used such that the imaging device 104 is blocked from light during non-capturing and is exposed to light during capturing. An electronic shutter (not shown) may also be used for the imaging device 104, without being limited to the mechanical shutter. The mechanical shutter or electronic shutter operates according to a switch of a shutter button (manipulation unit 160).

The imaging device 104 further includes a Correlated Double Sampling (CDS)/Amplifier (AMP) unit and an Analog-to-Digital (A/D) converter. The CDS/AMP unit cancels reset noise and amp noise included in the electric signal to be output from the imaging device 104 and amplifies the electric signal to an arbitrary level. The A/D converter converts the electric signal output from the CDS/AMP unit into a digital signal. The ND converter outputs the generated digital signal to the image signal processing unit 106.

The image signal processing unit 106 includes a pre-processor and an image processor. The pre-processor processes the digital signal output from the ND converter to generate an image signal which can be image-processed. The pre-processor may perform processing such as pixel defect correction, black level correction, and shading correction for the imaging device 104. The pre-processor outputs the generated image signal to the image processor.

The image processor receives the image signal from the pre-processor and transforms the image signal into a luminance signal and a chrominance signal. The image processor generates the image-processed image signal based on a White Balance (WB) control value, a Y luminance value, an edge enhancement control value, and the like. The image processor outputs the generated image signal to the still image/moving image compression processing unit 140.

The control unit 108 may be, for example, a Central Processing Unit (CPU), and controls components such as the lens unit 102 and the image signal processing unit 106 based on a signal output from the manipulation unit 160 or the overall signal processing unit 110.

The overall signal processing unit 110 may be, for example, a CPU, and may function as an operation processing device and a control device according to a program and controls processing of components installed in the photographing apparatus 100. The overall signal processing unit 110 may, for example, output a signal to the control unit 108 to drive the focus lens of the lens unit 102. Although instruction of the control unit 108 with respect to a manipulation system and instruction of the overall signal processing unit 110 with respect to a signal system are performed by their respective CPUs in the current embodiment of the invention, they may be performed by a single CPU.

The overall signal processing unit 110 includes an amount-of-movement calculating unit 112 and a guide line display unit 114.

The amount-of-movement calculating unit 112 may include, for example, a mode determination unit, an edge extracting unit, a straight line detecting unit, a target extracting unit, and a distance calculating unit.

The mode determining unit determines whether the photographing apparatus 100 is in a guide line display mode (auxiliary line display mode) where guide lines including a vertical line and a horizontal line are displayed on the screen. The edge extracting unit extracts an edge of an object image from image data obtained by photographing of an object. The straight line detecting unit detects a plurality of straight line portions from the extracted edge. The target extracting unit extracts target straight line portions from the plurality of detected straight line portions according to inclinations and lengths of the detected straight line portions within the screen. The distance calculating unit calculates the distance between the extracted target straight line portions and a vertical line or a horizontal line.

When the mode determining unit determines that the photographing apparatus 100 is in the guide line display mode, the guide line display unit 114 displays one horizontal line which is movable in the vertical direction within the screen and one vertical line which is movable in the horizontal direction within the screen. Herein, both the horizontal line and the vertical line may be displayed or any one of them may be displayed. There may be one or more auxiliary lines. The guide line display unit 114 is an example of an auxiliary line display unit. The guide line display unit 114 displays the vertical line or the horizontal line while moving the vertical line or the horizontal line towards the target straight line portions, based on the distance between the target straight line portions and the vertical line or the horizontal line. The guide line display unit 114 does not display either the vertical line or the horizontal line when it is determined that the photographing apparatus 100 is not in the guide line display mode.

The EVF driving unit 122 or the monitor driving unit 132 receives image data from Video Random Access Memory (VRAM) and displays an image on the screen of the EVF 124 or the LCD monitor 134. The EVF 124 and the LCD monitor 134 are installed in a main body of the photographing apparatus 100. The image displayed by the EVF 124 and the LCD monitor 134 is, for example, an image read from the VRAM prior to photographing (live view display), various setting screens of the photographing apparatus 100, or an image captured and recorded. The EVF 124 and the LCD monitor 134 may be, for example, an LCD or an organic electroluminescent (EL) display. Both the EVF 124 and the LCD monitor 134 may be installed in the photographing apparatus 100 like in the current embodiment, or any one of them may be installed in the photographing apparatus 100.

Guide lines (or auxiliary lines) are displayed on the EVF 124 and the LCD monitor 134 for allowing a photographer to easily determine a composition. The guide lines are displayed in an On Screen Display (OSD) manner based on a signal received by the EVF 124 or the LCD monitor 134 from the overall signal processing unit 110.

The still image/moving image compression processing unit 140 performs compression-encoding processing on the image data output from the image signal processing unit 106 by using an encoding method for a still image, such as a Joint Photographic Experts Group (JPEG) standard. The generated compressive-encoded data is recorded in the memory card 150.

The still image/moving image compression processing unit 140 receives image data of a still image from the image signal processing unit 106 and generates moving image data by performing encoding on the received still image data. The still image/moving image compression processing unit 140 may perform encoding, for example, into a Moving Picture Experts Group (MPEG) format, thereby generating stream data where a plurality of image frames is arranged into a single file. The generated moving image data is recorded in the memory card 150. The still image/moving image compression processing unit 140 performs decompression-decoding on encoding data of the still image or moving image provided from the memory card 150.

Image data is recorded in the memory card 150 and recorded image data or setting information is read from the memory card 150. The memory card 150 is a recording medium, for example, a magnetic disk or a semiconductor recording medium, and captured image data is recorded in the memory card 150. The memory card 150 may be an optical disk, such as a Compact Disc (CD), a Digital Versatile Disk (DVD), a Blue-ray disc, or the like, or an optical magnetic disk, without being limited to the form of a memory card, as long as it is a recording medium. The memory card 150 may be removable from the photographing apparatus 100.

The manipulation unit 160 may include, for example, an up/down/left/right key, a power switch, a mode dial, and a shutter button installed in the photographing apparatus 100. The manipulation unit 160 outputs a manipulation signal to the control unit 108 based on user's manipulation. For example, the shutter button used in capturing a still image may be manipulated by user's half-pressing (S1 manipulation), user's full-pressing (S2 manipulation), or user's release. When the shutter button is half-pressed, a manipulation signal indicating start of focus control is output. When the half-pressed shutter button is released, the focus control is terminated. When the shutter button is full-pressed, a manipulation signal indicating start of photographing is output.

A series of processes in the photographing apparatus 100 may be implemented with hardware or software using a program on a computer.

Figure 2:
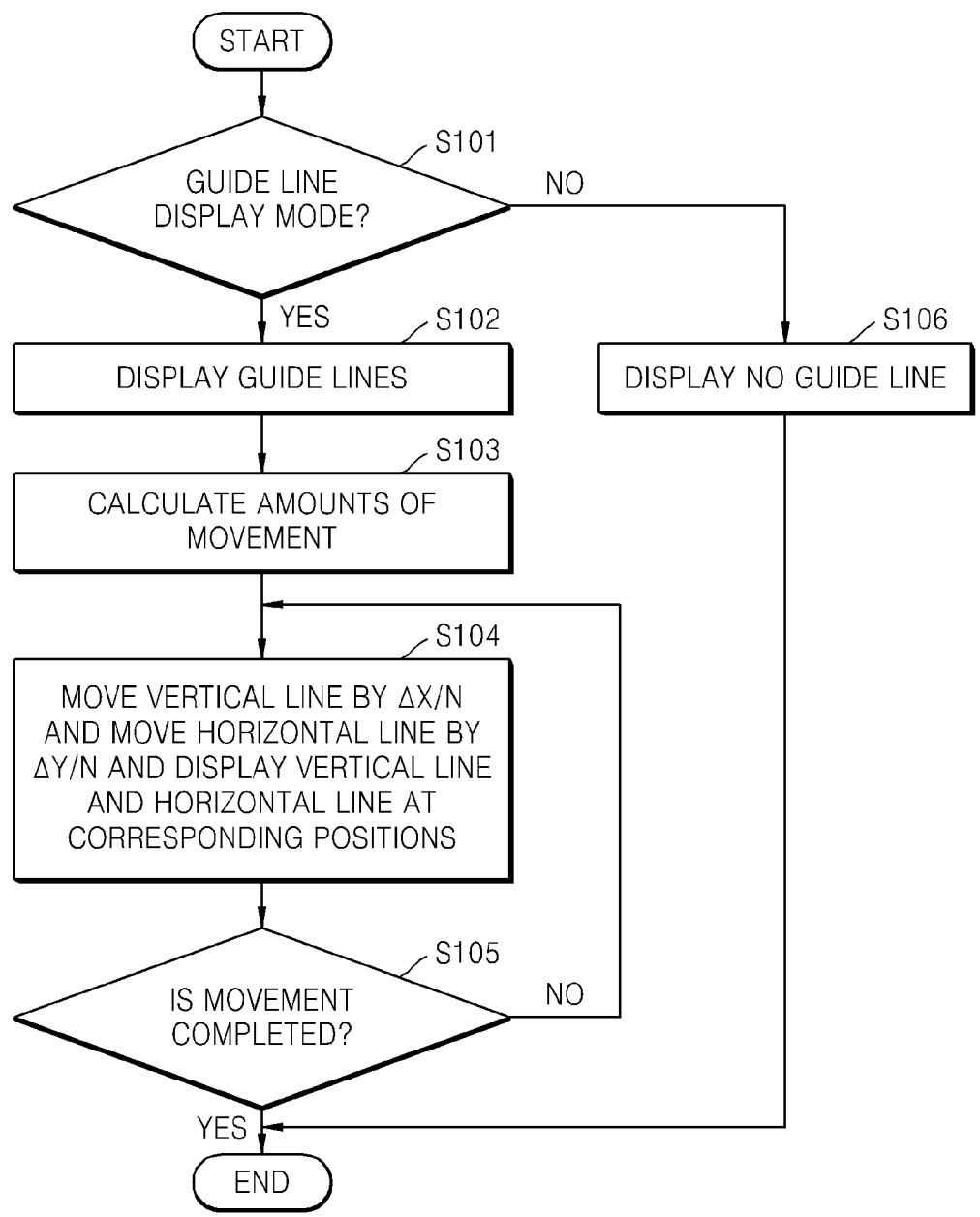
FIG. 2 is a flowchart illustrating an operation of displaying guide lines by the photographing apparatus shown in FIG. 1.

An operation of displaying guide lines by the photographing apparatus 100 will now be described with reference to FIG. 2 which is a flowchart illustrating the operation of displaying guide lines by the photographing apparatus 100 according to an embodiment of the present invention.

Figure 4:
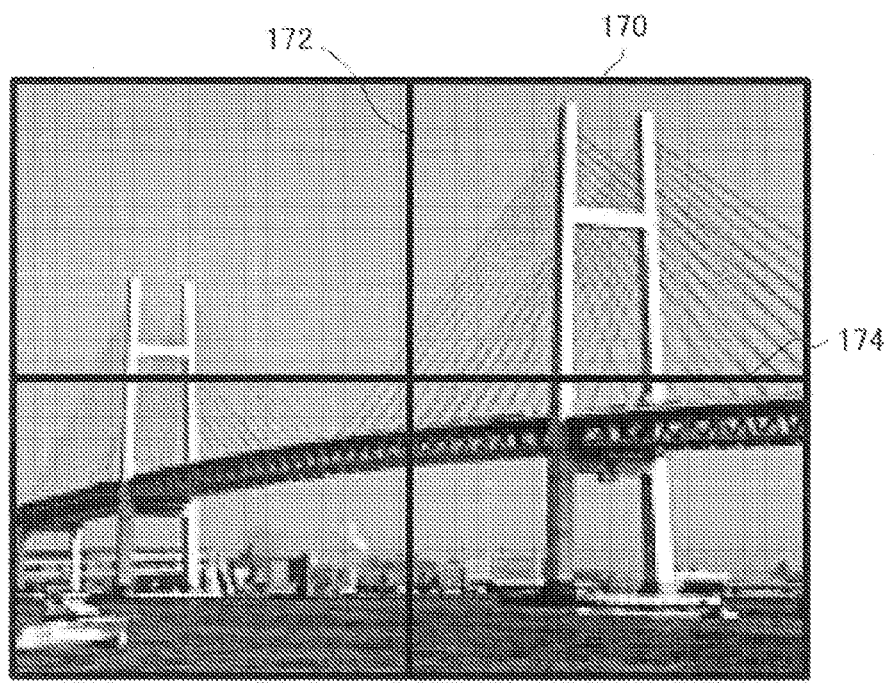
FIG. 4 is a pictorial diagram showing a screen where the guide lines are displayed.
Figure 8:
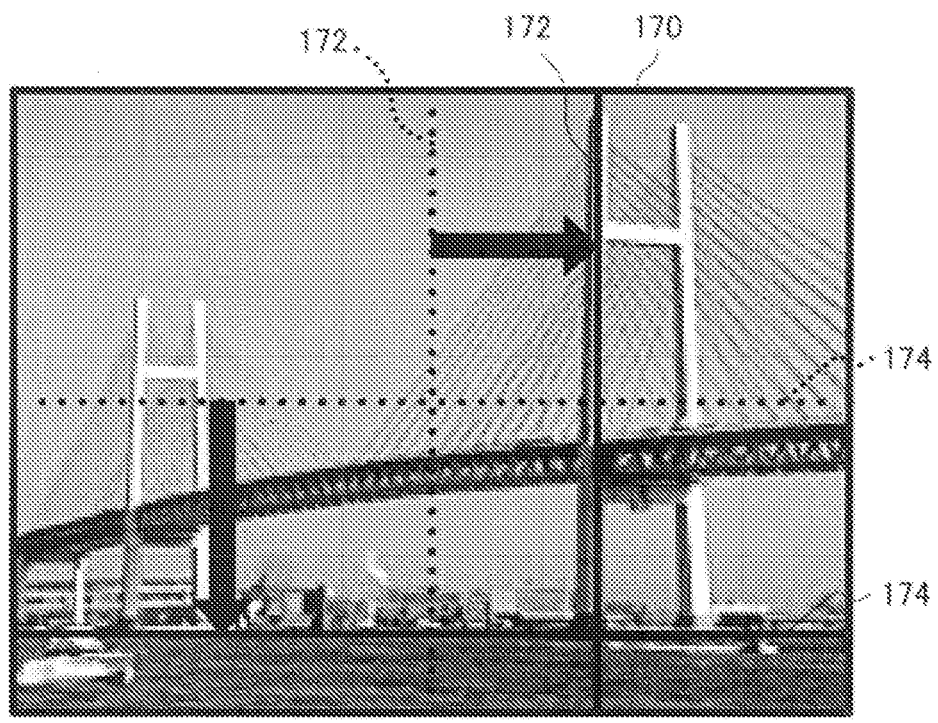
FIG. 8 is a pictorial diagram showing a screen where the guide lines are displayed.

The guide lines according to the current embodiment of the present invention include a vertical line 172 and a horizontal line 174 as shown in FIG. 4, and gradually move from an object image towards detected target straight line portions. As the guide lines move, a photographer aligns the object image to the guide lines, such that the guide lines are displayed along the target straight line portions as shown in FIG. 8. FIGS. 4 and 8 are diagrams showing a screen 170 where the guide lines are displayed.

Hereinafter, the operation of displaying the guide lines will be described in detail. The photographing apparatus 100 determines whether it is in a guide line display mode enabling display of the guide lines on the screen of the EVF 124 or the LCD monitor 134 in operation S101. The start or end of the guide line display mode is selected and determined by a photographer through a menu screen.

If it is determined that the photographing apparatus 100 is in the guide line display mode in operation S101, the photographing apparatus 100 displays the guide lines on the screen in operation S102. The guide lines include two straight lines, one vertical line 172 and one horizontal line 174, as shown in FIG. 4, and divide the screen 170 into four sections. Both the vertical line 172 and the horizontal line 174 are straight lines which extend from an end portion of a side of the screen 170 or the vicinity of the end portion to an end portion of another side of the screen 170 or the vicinity of the end portion of the another side. As such, through the long straight lines displayed on the screen, the photographer can easily recognize the position of the guide lines. In addition, when compared to a case where the guide lines are displayed only near a straight line portion on the screen, the photographer can easily align the object image to the vertical line 172 or the horizontal line 174 on the screen.

In case of transition from a non-guide line display mode to the guide line display mode through menu selection by the photographer, the vertical line 172 and the horizontal line 174 of the guide lines are displayed to pass through the center of the screen 170 as shown in FIG. 4.

Next, target straight line portions (a target vertical straight line portion and a target horizontal straight line portion) to which movement from the object image is targeted are detected and the guide lines are moved to the detected target straight line portions. The target straight line portions refer to straight lines included in the object image to be used as reference lines for setting a composition of an image. Herein, both the target vertical straight line portion and the target horizontal straight line portion are detected, but any one of them may be detected.

Figure 7:
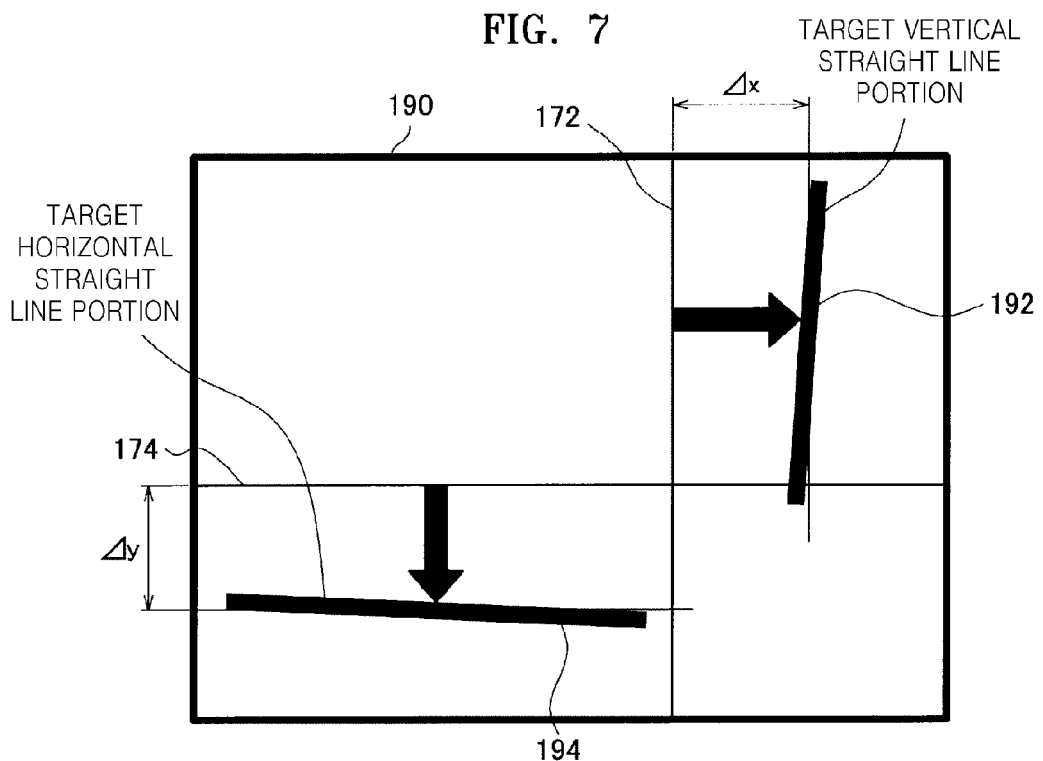
FIG. 7 is a pictorial diagram showing an image where a relationship between the guide lines and target straight line portions is shown.

For movement of the guide lines towards the target straight line portions, the amounts of movement of the guide lines within the screen are calculated in operation S103. The amounts of movement are calculated as $\Delta x$ with respect to the vertical line 172 and $\Delta y$ with respect to the horizontal line 174, as shown in FIG. 7 which is a diagram showing an image 190 where a relationship between the guide lines and the target straight line portions is shown.

$\Delta x$ is a distance from a current position of the vertical line 172 to a target vertical straight line portion 192, and $\Delta y$ is a distance from a current position of the horizontal line 174 to a target horizontal straight line portion 194. Calculation of the amounts of movement will be described in more detail later.

Once the amounts of movement are calculated, the vertical line within the screen is moved in the unit of $\Delta x/n$ to the target vertical straight line portion, and the horizontal line within the screen is moved in the unit of $\Delta y/n$ to the target horizontal straight line portion in operation S104. 'n' is a natural number when the movement is completed by processing n times. The guide lines are gradually moved from the current position to the target straight line portions for a relatively long time which allows the photographer to recognize the movement, rather than for a short time. By doing so, the photographer can easily find the guide lines within the screen and thus easily move the object image within the screen by aligning the object image to the guide lines.

The calculation of the amounts of movement is performed after the photographing apparatus 100 recognizes change of the object image or change of a scene on the screen, or at relatively long time intervals. Unlike in the current embodiment, if the guide lines are moved to the target straight line portions within a short time, or the calculation of the amounts of movement is performed at short time intervals, the guide lines may be displayed at several positions or may not be displayed on the screen during composition setting of the photographer. As a result, the display of the guide lines may annoy the photographer. By gradually moving the guide lines to the target straight line portions and calculating the amounts of movement at relatively long time intervals like in the current embodiment, the guide lines are displayed late to follow the target straight line portions when the photographer causes the object image to deviate from the guide lines. Accordingly, the photographer can easily set a composition of an image.

In operation S105, the photographing apparatus 100 also determines whether the guide lines are moved n times or a distance between the current position and the target straight lie portion is 0 (zero), to determine whether the movement is completed. If it is determined that the movement is completed, the guide lines are continuously displayed at that position as shown in FIG. 8. If it is determined that the movement is not completed, the movement of the guide lines continues.

So far, the description has been made regarding a case where it is determined that the photographing apparatus 100 is in the guide line display mode in operation S101. Meanwhile, if it is determined that the photographing apparatus 100 is not in the guide line display mode in operation S101, the guide lines are not displayed on the screen in operation S106. In case of transition from the guide line display mode to the non-guide line display mode through photographer's menu selection, the guide lines are removed from the screen.

Thus, when it is determined that the photographer desires not to display the guide lines, the guide lines may not be displayed on the screen.

Figure 3:
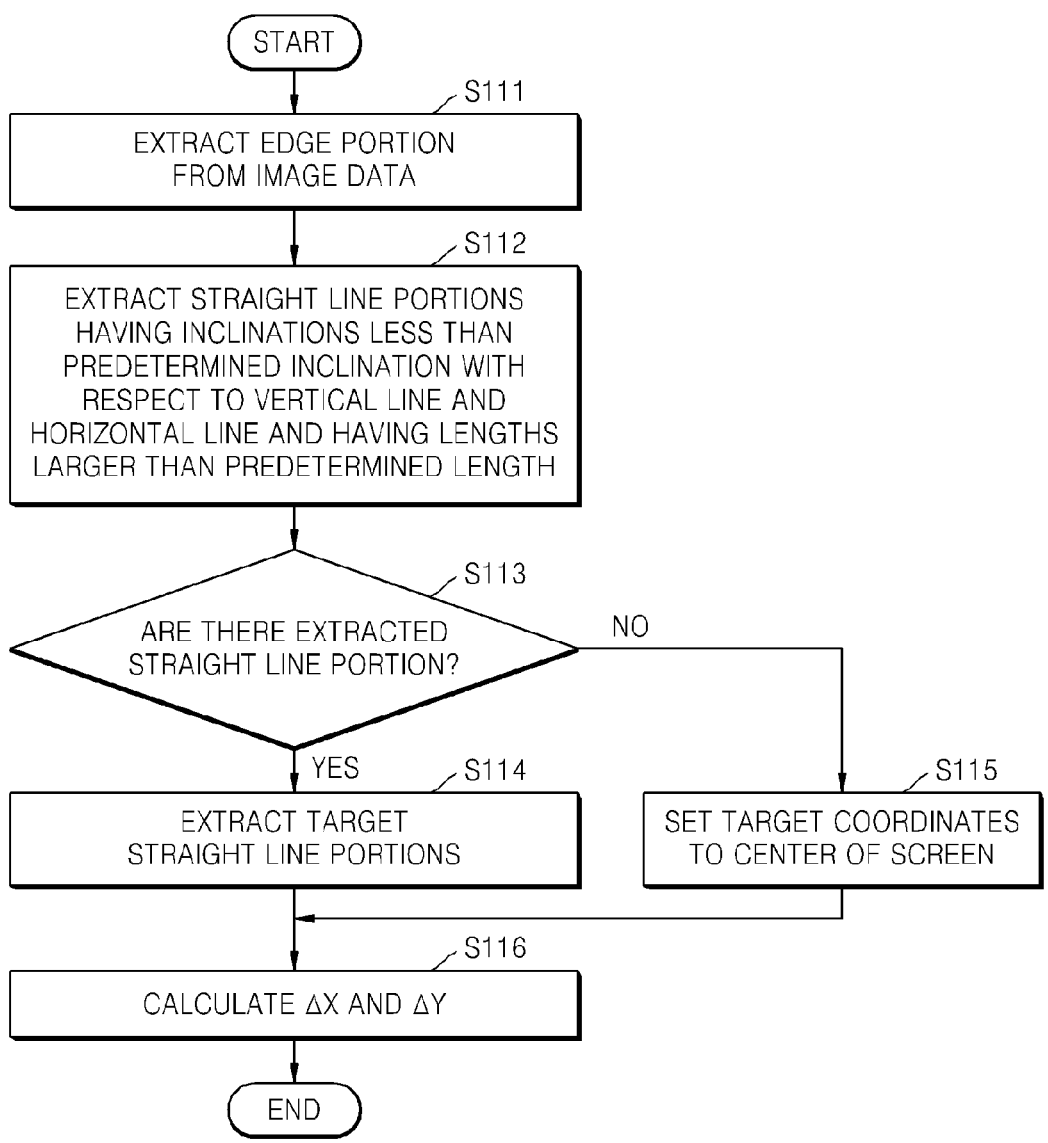
FIG. 3 is a flowchart illustrating an operation of calculating the amount of movement of the guide lines by the photographing apparatus shown in FIG. 1.

Next, an operation of calculating the amounts of movement of the guide lines by the photographing apparatus 100 according to the current embodiment of the present invention will be described with reference to FIG. 3, which is a flowchart illustrating the operation of calculating the amounts of movement of the guide lines by the photographing apparatus 100 according to the current embodiment of the present invention.

Once the guide lines are displayed on the screen in the guide line display mode, the amounts of movement of the guide lines within the screen are calculated for movement of the guide lines towards the target straight line portions. Hereinafter, the operation of calculating the amounts of movement of the guide lines will be described in detail.

Figure 5:
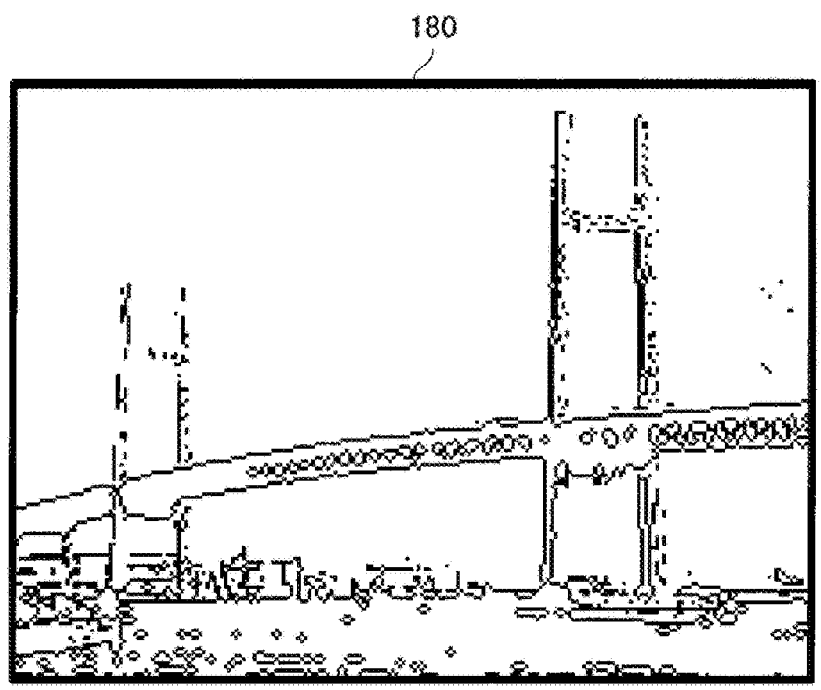
FIG. 5 is a pictorial diagram showing an image where a result of extracting an edge from an object image and binarizing the extracted edge is shown.
Figure 6:
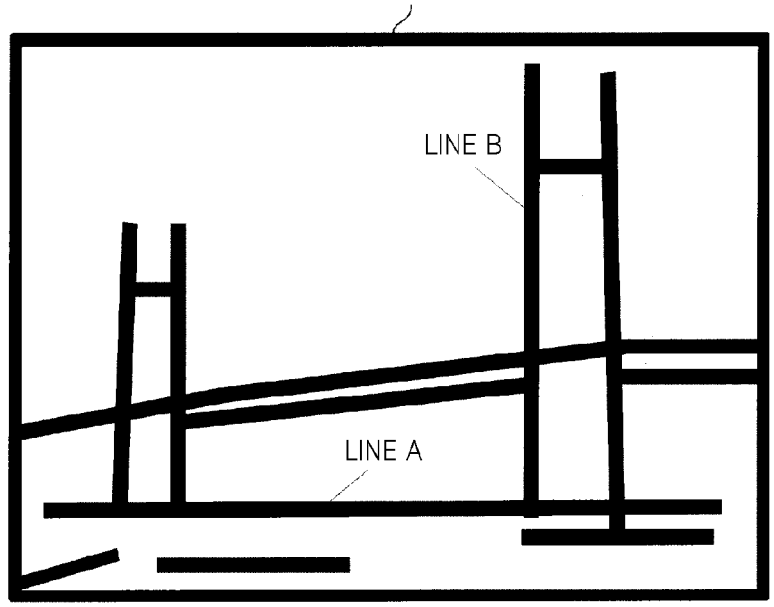
FIG. 6 is a pictorial diagram showing an image where a result of performing straight-line approximation on an object image is shown.

First, the target vertical straight line portion and the target horizontal straight line portion to which the movement of the guide lines from the image that is being captured is targeted are detected. For example, an edge portion of the object image is extracted from the entire image data obtained by photographing the object in operation S111. The edge extraction may use, for example, a technique generally used in image processing. The extracted edge portion is binarized to obtain an image 180 as shown in FIG. 5 which is a diagram showing the image 180 where a result of extracting an edge from the object image and binarizing the extracted edge is shown. The entire image is approximated to straight lines as shown in FIG. 6 based on the result of the extraction and the binarization. FIG. 6 is a diagram showing an image 190 where the result of performing straight-line approximation on the object image is shown.

In operation S112, straight line portions which have inclinations less than a predetermined inclination with respect to a vertical line and a horizontal line and have lengths larger than a predetermined length are extracted from a plurality of straight line portions included in the image obtained by straight-line approximation. By limiting the straight line portions with the predetermined inclination and the predetermined length for extraction, straight line portions which are irrelevant to determination of the composition of the image can be excluded and the guide lines can be moved towards the straight line portions which are highly relevant to the determination of the composition.

In operation S113, it is determined whether there are extracted straight line portions in operation S112. If so, the target vertical straight line portion and the target horizontal straight line portion are extracted from the extracted straight line portions in operation S114. In an example shown in FIG. 6, a straight line A is extracted as the target horizontal straight line portion and a straight line B is extracted as the target vertical straight line portion.

For example, the target vertical straight line portion and the target horizontal straight line portion may be extracted by selecting the straight lines which have, respectively, (1) the largest lengths in the vertical direction and in the horizontal direction from among the plurality of extracted straight line portions. The target vertical straight line portion and the target horizontal straight line portion may also be extracted by selecting the straight lines which have, respectively, (2) the smallest inclinations with respect to the vertical line and the horizontal line from among the plurality of extracted straight line portions. The target vertical straight line portion and the target horizontal straight line portion may also be extracted by selecting the straight lines which have, respectively, (3) the smallest distances from the center of the screen in the vertical direction and in the horizontal direction from among the plurality of extracted straight line portions.

The condition (1) gives priority to the length of a straight line portion over a position or inclination of the straight line. The condition (2) gives priority to the inclination of the straight line over the position or length of the straight line. The condition (3) gives priority to the position of the straight line (relative to the center of the screen) over the length or inclination of the straight line portion. Any one of the conditions (1) through (3) is determined in advance for use in straight line portion detection. The condition may be determined according to a status of a captured object image. The conditions (1) through (3) may also be used in combination according to priority given thereto. Based on the determined condition, the target vertical straight line portion and the target horizontal straight line portion are extracted in operation S114. Although the conditions (1) through (3) are described herein, other conditions may also be set without being limited to the conditions (1) through (3).

As shown in FIG. 7, the distance $\Delta x$ from the current position of the vertical line 172 to the center of the target vertical straight line portion 192 and the distance $\Delta y$ from the current position of the horizontal line 174 to the center of the target horizontal straight line portion 194 are calculated in operation S116. The calculation of the distance may also be calculating the distance from the current position of the vertical line 172 or the horizontal line 174 to another portion of the target straight line portion, instead of the center of the target straight line portion, for example, the edge or end portion of the target straight line portion.

If there is no straight line portion having an inclination less than the predetermined inclination and a length less than the predetermined length in operation S112 and there is no extracted straight line portion in operation S113, target coordinates to which the guide lines are to be moved are set to the center of the screen in operation S115. The distance $\Delta x$ from the current position of the vertical line 172 to the center of the screen and the distance $\Delta y$ from the current position of the horizontal line 174 to the center of the screen are calculated in operation S116.

In this way, the calculation of the amounts of movement is completed. Thereafter, the guide lines are moved within the screen based on the amounts of movement.

Figure 11:
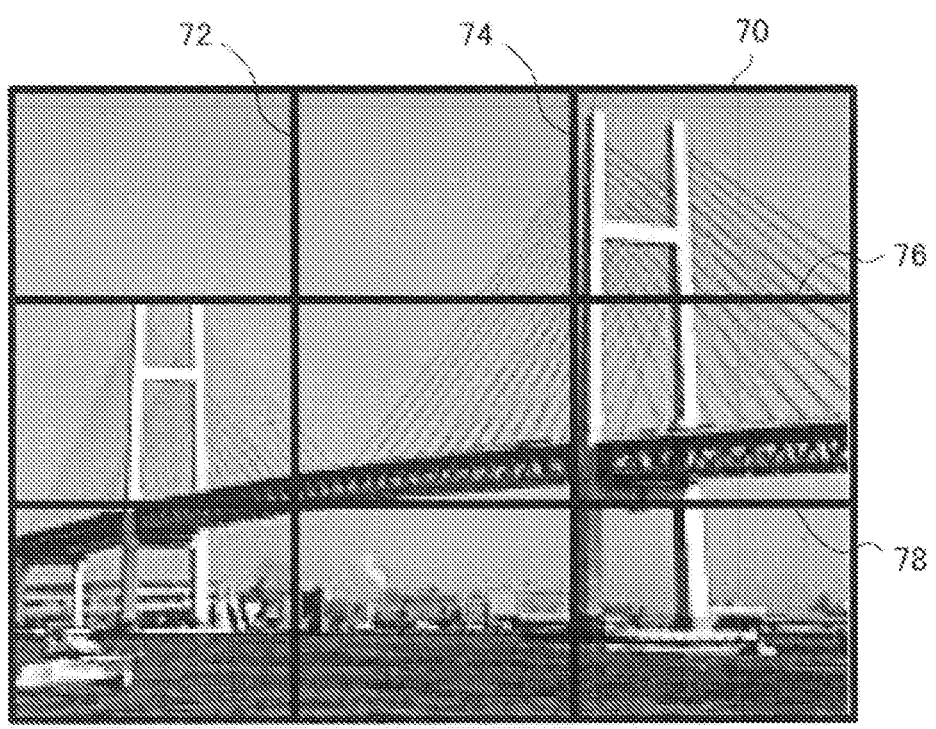

Auxiliary lines displayed in a finder according to prior art generally have a display pattern as shown in FIG. 11, such that two vertical lines 72 and 74 and two horizontal lines 76 and 78 are displayed at equivalent intervals within a screen 70 to divide the screen 70 into nine sections. FIG. 11 is a diagram showing the screen 70 where the auxiliary lines are displayed. For the display of the auxiliary lines, whether the auxiliary lines are displayed in a fixed manner within the screen or the auxiliary lines are not shown within the screen may be selected by photographer's menu manipulation.

Figure 9:
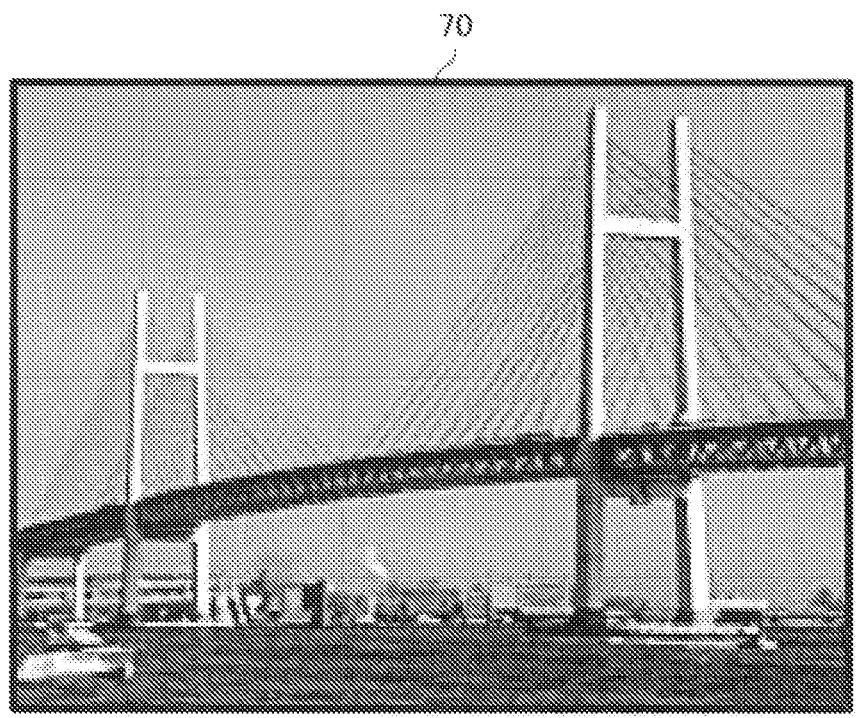
FIG. 9 is a pictorial diagram showing a screen where the object image is displayed.
Figure 10:
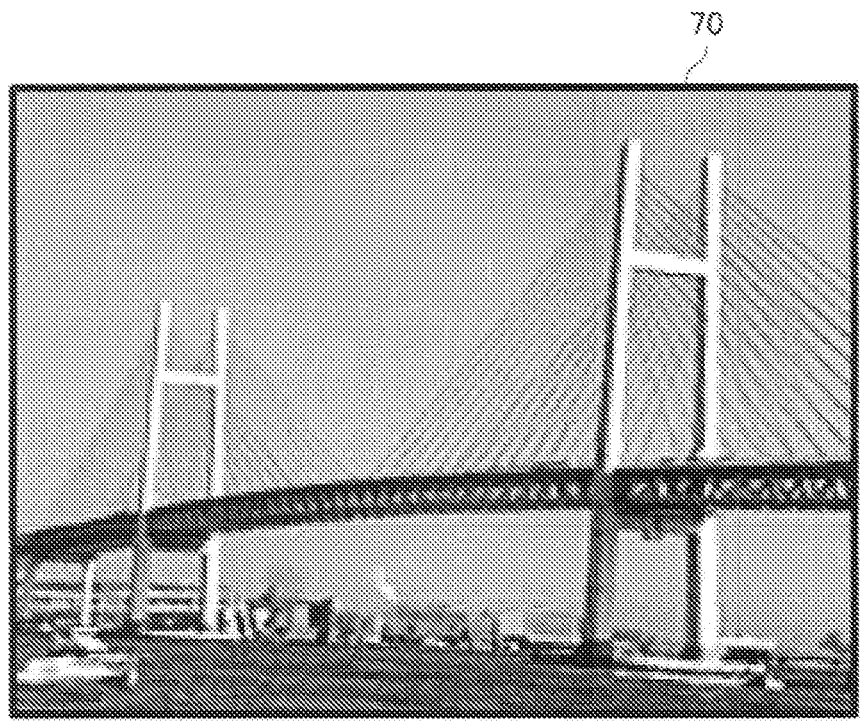
FIGS. 10 and 11 are pictorial diagrams showing a screen where an object image is displayed and a screen where auxiliary lines are displayed according to prior art.

When an image is captured by using a photographing apparatus, it is desirable to photograph an object in such a way that a vertical line along a structure forms a vertical direction within the screen 70, the horizon forms a horizontal direction within the screen 70, and thus the vertical direction and the horizontal direction of the object image are in parallel with the outline of the screen 70, as shown in FIG. 9 which is a diagram showing the screen 70 where the object image is displayed. However, if the image is captured without using the auxiliary lines, the main body of the photographing apparatus is rotated clockwise or counter-clockwise in a plane of the image sensor, whereby the image which is not desirable in terms of composition is captured as shown in FIG. 10. In FIG.

10, the horizon is rotated clockwise. FIG. 10 is a diagram showing the screen 70 where the object image is displayed.

To prevent the image having an undesirable composition as shown in FIG. 10 from being captured, the photographing apparatus displays auxiliary lines within the screen 70 as shown in FIG. 11, in which the auxiliary lines function to indicate a vertical or horizontal inclination of the object image to the photographer. The auxiliary lines are displayed by using an OSD function on the screen of an LCD monitor or an EVF.

However, the conventional auxiliary lines are displayed in a fixed manner within the screen 70. Thus, when the object image is near one of the four auxiliary lines within the screen 70, the photographer can easily align the vertical direction or horizontal direction to straight line portions of the object image. However, when the straight line portions of the object image are away from the auxiliary lines, it is difficult to capture the object image with a desirable composition. For example, in FIG. 11, by aligning the horizon to the auxiliary horizontal line 78 within the screen 70, a desirable composition can be obtained. However, since the auxiliary horizontal line 78 is away from the horizontal line of the horizon within the screen 70, the photographer may have difficulty in aligning the screen 70 horizontally. If the photographer changes the composition to make the horizon and the auxiliary horizontal line 78 close to each other within the screen 70, other portions of the object image, for example, the peak portion of a suspension bridge in FIG. 11, may not be shown within the screen 70 and thus the original target composition may not be achieved.

In case of an object which does not need alignment with the vertical or horizontal direction, division of the screen into nine sections by four auxiliary lines may obstruct the image or annoy the photographer, making it difficult for the photographer to understand the screen.

However, according to the current embodiment of the present invention, by embedding a sensor for sensing the horizontal or vertical direction in the photographing apparatus 100, a proper composition can be easily obtained without a need to display the vertical line or horizontal line on the screen.

In the current embodiment, the guide lines including vertical lines and horizontal lines are moved to a proper position, such that the photographer can easily align the object image to the guide lines. For example, when the guide lines are fixed as in conventional art, the object image is compulsorily aligned to the guide lines and thus the original target composition may not be achieved. In the current embodiment, however, such a problem does not occur.

Moreover, in the current embodiment, since the guide lines movable within the screen extend from the end portion of a side of the screen or the vicinity of the end portion of the side to the end portion of another side of the screen or the vicinity of the end portion of the another side, the photographer can more easily align the vertical direction or the horizontal direction than when short auxiliary lines are displayed. Furthermore, the target straight line portions are extracted and the guide lines are moved toward the extracted target straight line portions, such that the object image can be easily aligned to the guide lines. In addition, the current embodiment of the invention displays the guide lines while moving the guide lines, reducing change of the guide lines and thus allowing the photographer to conveniently determine the composition.

While the present invention has been particularly shown and described with reference to an exemplary embodiment thereof, the present invention is not limited thereto. It is obvious that those of ordinary skill in the art may contemplate various changes or modifications within the scope of the technical sprit disclosed in the claims, and it may be understood that those changes or modifications fall within the technical scope of the present invention.

For example, the guide lines include one vertical line and one horizontal line in the foregoing embodiment, but the present invention is not limited to such an example. Thus, the guide lines may include three or more lines, for example, two vertical lines and two horizontal lines.

While two guide lines can move within the screen in the above embodiment, both of them do not necessarily move within the screen. For example, in the case of the guide lines including two vertical lines and two horizontal lines, one vertical line and one horizontal line may be fixed within the screen and the other vertical line and horizontal line may move within the screen.

As can be appreciated from the foregoing description, the photographing apparatus according to the embodiment of the present invention displays auxiliary lines to which the photographer can easily align an object image, instead of cumbersome auxiliary lines.

The photographing apparatus according to the present invention may include a processor, a memory for storing and executing program data, a permanent storage such as a disk drive, a communication port for communicating with an external device, and a user interface unit, such as a touch panel, a key, or a button. Methods implemented with a software module or algorithm may be stored as computer-readable codes or program commands, which can be executed on the processor, on a computer-readable recording medium, etc. Examples of the computer-readable recording medium may include magnetic storage media such as read-only memory (ROM), random access memory (RAM), floppy disks, and hard disks, and optical data storage devices such as CD-ROMs and digital versatile discs (DVD). The computer-readable recording medium can also be distributed over a network of coupled computer systems so that the computer-readable code is stored and executed in a decentralized fashion. The code can be read by the computer, stored in the memory, and executed on the processor.

All documents cited in the present invention, including published documents, patent applications, and patents, may be incorporated herein in their entirety by reference in the same manner as when each cited document is separately and specifically incorporated or incorporated in its entirety.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the present invention could employ conventional techniques for electronics configuration, signal processing and/or control, data processing and the like. Terms such as "mechanism", "element", "means", "component", etc., may be used in a broad sense, and are not limited to mechanical and physical components. The terms may include a meaning of a series of routines of software in connection with a processor or the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical."

In the specification (particularly in the claims) of the present invention, the use of the term "the" and its similar indicative terms may correspond to both singular and plural. When a range is stated in the present invention, it covers the invention where an individual value included in that range is applied (unless stated otherwise), and such statement is equivalent to statement of each individual value forming the range in the detailed description of the invention. Unless the order of steps forming the method according to the invention are explicitly stated or stated otherwise, those steps may be performed in any appropriate order. The stated order of the steps does not necessarily limit the invention. In the invention, the use of any example or exemplary term (for example, "and so forth") is merely intended to describe the invention in detail, and thus unless defined by the claims, the scope of the invention is not limited by the example or exemplary term. In addition, it can be understood by those of ordinary skill in the art that various modifications, combinations, and changes can be made according to design conditions and factors within the scope of claims and equivalents thereof.

What is claimed is:

1. A photographing apparatus comprising:
    an auxiliary line display unit that displays auxiliary lines comprising at least one of at least one vertical line movable in a horizontal direction within a screen and at least one horizontal line movable in a vertical direction within the screen;
    an edge extracting unit that extracts an edge of an object image from image data obtained by photographing an object;
    a straight line detecting unit that detects at least one straight line portion from the extracted edge;
    a target extracting unit that extracts a target straight line portion from the detected at least one straight line portion, according to at least one of an inclination and a length of the detected at least one straight line portion; and
    a distance calculating unit that calculates a distance between the extracted target straight line portion and at least one of the vertical line and the horizontal line,
    wherein the auxiliary line display unit moves at least one of the vertical line and the horizontal line towards the target straight line portion based on the calculated distance between the target straight line portion and the at least one of the vertical line and the horizontal line.

2. The photographing apparatus of claim 1, wherein the auxiliary line display unit displays the at least one of the vertical line and the horizontal line while moving the at least one of the vertical line and the horizontal line based on the calculated distance between the target straight line portion and the at least one of the vertical line and the horizontal line.

3. The photographing apparatus of claim 1, further comprising a mode determining unit that determines whether the photographing apparatus is in an auxiliary line display mode where at least one of the vertical line and the horizontal line is displayed within the screen,
    wherein the auxiliary line display unit displays the at least one of the vertical line and the horizontal line within the screen if the mode determining unit determines that the photographing apparatus is in the auxiliary line display mode, and does not display the at least one of the vertical line and the horizontal line if the mode determining unit determines that the photographing apparatus is not in the auxiliary line display mode.

4. The photographing apparatus of claim 1, wherein the target extracting unit extracts a straight line portion having the largest length among the detected at least one straight line portion as the target straight line portion.

5. The photographing apparatus of claim 1, wherein the target extracting unit extracts a straight line portion having the smallest inclination with respect to the horizontal line or the vertical line among the detected at least one straight line portion as the target straight line portion.

6. The photographing apparatus of claim 1, wherein the target extracting unit extracts a straight line portion having the smallest distance from a center of the screen among the detected at least one straight line portion as the target straight line portion.

7. The photographing apparatus of claim 1, wherein if the target extracting unit cannot extract the target straight line portion,
    the distance calculating unit calculates a distance between a center of the screen and the vertical line or the horizontal line, and
    the auxiliary line display unit displays the vertical line or the horizontal line while moving the vertical line or the horizontal line toward the center of the screen based on the distance between the center of the screen and the vertical line or the horizontal line.

8. A photographing apparatus comprising:
    an auxiliary line display unit that displays auxiliary lines comprising at least one of at least one vertical line movable in a horizontal direction within a screen and at least one horizontal line movable in a vertical direction within the screen;
    an edge extracting unit that extracts an edge of an object image from image data obtained by photographing an object;
    a straight line detecting unit that detects a plurality of straight line portions from the extracted edge;
    a target extracting unit that extracts a target straight line portion from the plurality of detected straight line portions, according to inclinations and lengths of the plurality of detected straight line portions; and
    a distance calculating unit that calculates a distance between the extracted target straight line portion and at least one of the vertical line and the horizontal line, wherein the auxiliary line display unit displays the vertical line or the horizontal line while moving the vertical line or the horizontal line towards the target straight line portion based on the calculated distance between the target straight line portion and the vertical line or the horizontal line.

9. A photographing method comprising:
displaying on a screen of a photographic apparatus auxiliary lines comprising at least one of at least one vertical line movable in a horizontal direction within the screen and at least one horizontal line movable in a vertical direction within the screen;
extracting by a processor of said photographic apparatus an edge of an object image from image data obtained by photographing an object;
detecting by said processor at least one straight line portion from the extracted edge;
extracting by said processor a target straight line portion from the detected at least one straight line portion, according to at least one of an inclination and a length of the detected at least one straight line portion;
calculating by said processor a distance between the extracted target straight line portion and at least one of the vertical line and the horizontal line; and
moving by said processor at least one of the vertical line and the horizontal line on said screen towards the target straight line portion based on the calculated distance between the target straight line portion and the at least one of the vertical line and the horizontal line.

10. The photographing method of claim 9, wherein the moving of the at least one of the vertical line and the horizontal line comprises displaying the at least one of the vertical line and the horizontal line while moving the at least one of the vertical line and the horizontal line based on the calculated distance between the target straight line portion and the at least one of the vertical line and the horizontal line.

11. The photographing method of claim 9, further comprising determining whether the photographing apparatus is in an auxiliary line display mode where at least one of the vertical line and the horizontal line is displayed within the screen,
wherein the displaying of the auxiliary lines comprises displaying the at least one of the vertical line and the horizontal line within the screen if it is determined that a current mode is the auxiliary line display mode, and displaying neither the vertical line nor the horizontal line if the current mode is not the auxiliary line display mode.

12. The photographing method of claim 9, wherein the extracting of the target straight line portion comprises extracting a straight line portion having the largest length among the detected at least one straight line portion as the target straight line portion.

13. The photographing method of claim 9, wherein the extracting of the target straight line portion comprises extracting a straight line portion having the smallest inclination with respect to the horizontal line or the vertical line among the detected at least one straight line portion as the target straight line portion.

14. The photographing method of claim 9, wherein the extracting of the target straight line portion comprises extracting a straight line portion having the smallest distance from a center of the screen among the detected at least one straight line portion as the target straight line portion.

* * * * *